(12) United States Patent
Hartmann et al.

(10) Patent No.: US 9,982,410 B2
(45) Date of Patent: May 29, 2018

(54) POLYAMIDE-SHEATHED STRUCTURAL STEEL TUBES FOR OFFSHORE STRUCTURES

(75) Inventors: Markus Hartmann, Sendenhorst (DE); Claudia Behrens, Herdecke (DE); Reinhard Beuth, Marl (DE); Joern Winkels, Werl (DE); Hans-Juergen Kocks, Freudenberg (DE); Konrad Thannbichler, Siegen (DE)

(73) Assignees: Evonik Degussa GmbH, Essen (DE); Salzgitter Mannesmann Line Pipe GmbH, Siegen (DE)

( * ) Notice: Subject to any disclaimer, the term of this patent is extended or adjusted under 35 U.S.C. 154(b) by 1051 days.

(21) Appl. No.: 13/443,453

(22) Filed: Apr. 10, 2012

(65) Prior Publication Data

US 2012/0257932 A1    Oct. 11, 2012

(30) Foreign Application Priority Data

Apr. 11, 2011  (DE) .................. 10 2011 007 104

(51) Int. Cl.
*E02D 27/52*  (2006.01)
*E02D 27/42*  (2006.01)

(52) U.S. Cl.
CPC ............. *E02D 27/42* (2013.01); *E02D 27/52* (2013.01)

(58) Field of Classification Search
CPC .................................. E02D 7/42; E02D 27/52
USPC .............................. 405/211, 211.1, 212, 216
See application file for complete search history.

(56) References Cited

U.S. PATENT DOCUMENTS

| | | | | |
|---|---|---|---|---|
| 4,155,671 A * | 5/1979 | Vos | .................. | 405/203 |
| 5,087,154 A * | 2/1992 | Crawford | .................. | 405/216 |
| 5,435,667 A * | 7/1995 | Strange | .................. | 405/216 |
| 5,565,051 A * | 10/1996 | Marzola et al. | .................. | 156/94 |
| 6,030,672 A * | 2/2000 | Usui | .................. | 428/35.8 |
| 6,500,565 B2 * | 12/2002 | Usui | .................. | 428/623 |
| 6,531,019 B2 * | 3/2003 | Usui | .................. | 156/244.13 |
| 8,017,691 B2 | 9/2011 | Richter et al. | | |
| 2001/0023537 A1 * | 9/2001 | Gahlmann et al. | .......... | 29/897.2 |
| 2005/0038201 A1 * | 2/2005 | Wursche et al. | .............. | 525/340 |
| 2005/0206168 A1 * | 9/2005 | Murakami et al. | ............. | 290/55 |
| 2006/0182916 A1 | 8/2006 | Dowe et al. | | |
| 2006/0183869 A1 * | 8/2006 | Dowe et al. | ................. | 525/340 |
| 2010/0300572 A1 | 12/2010 | Dowe et al. | | |
| 2012/0000541 A1 | 1/2012 | Dowe et al. | | |

FOREIGN PATENT DOCUMENTS

| | | |
|---|---|---|
| DE | 101 17 113 A1 | 10/2002 |
| EA | 18498 | 8/2010 |
| JP | 03-281822 | 12/1991 |
| JP | 2006-46013 | 2/2006 |
| JP | 2006037397 | 2/2006 |
| JP | 2006-218699 | 8/2006 |
| JP | 2006-225660 | 8/2006 |
| RU | 2 304 664 | 8/2007 |
| WO | WO 2010/094528 A1 | 8/2010 |

OTHER PUBLICATIONS

U.S. Appl. No. 13/872,207, filed Apr. 29, 2013, Berger, et al.
U.S. Appl. No. 13/872,226, filed Apr. 29, 2013, Berger, et al.
European Search Report dated May 31, 2012 in Patent Application No. 12161634.6 (with Translation of Categories of Cited Documents).
Office Action in Russian corresponding application No. 2012113908/03 (020984), dated Apr. 27, 2016.

* cited by examiner

*Primary Examiner* — Benjamin F Fiorello
(74) *Attorney, Agent, or Firm* — Oblon, McClelland, Maier & Neustadt, L.L.P.

(57) ABSTRACT

The foundation structure of an offshore structure, for example of an offshore wind energy system, is composed of steel tubes sheathed by an extruded layer made of a polyamide moulding composition. This simultaneously ensures both good protection from corrosion and good protection from mechanical effects, giving the foundation structure markedly prolonged lifetime.

20 Claims, No Drawings

POLYAMIDE-SHEATHED STRUCTURAL STEEL TUBES FOR OFFSHORE STRUCTURES

BACKGROUND OF THE INVENTION

Field of the Invention

The invention relates to the use of structural steel tubes sheathed by an extruded layer made of a polyamide moulding composition in the foundation structure of offshore structures.

Description of the Background

Offshore structures are fixed structures erected offshore in open-sea locations. Examples of these offshore structures are wind energy systems, drilling platforms and lighthouses. Pipelines are not offshore structures for the purposes of the invention.

The foundation structure of offshore structures is the region that supports the actual functional unit. In the case of wind energy systems, the foundation structure supports the tower inclusive of turbine and rotors. In the case of drilling platforms, the foundation structure supports the platform inclusive of superstructure. In the case of lighthouses, the foundation structure supports the tower, if present, and also the lamp. The foundation structure is under water, in the intertidal zone, in the splash zone, or else sometimes in the aerosol zone. The foundation structure includes the foundation elements which anchor it in the sea floor.

As a consequence of the planned expansion of use of wind energy, a large number of offshore wind energy systems are planned for the coming years in the North Sea and also in other seas and in lakes. The entirety of the mechanical system of an offshore wind energy system is composed of the following components: turbines, rotors, tower and foundation structure.

Construction of foundations for these systems on the floor of the body of water, at locations which can be more than 100 km distant from the shore requires specific structural elements which differ greatly from those in the onshore sector. Some regions of these complicated structural elements, e.g. monopiles, jackets, tripods, triples, etc., have exposure to high static, and especially dynamic, loads, and also to high levels of corrosive attack. Factors that have to be considered, depending on the situation and depth of water at the particular location in question, are what is known as the 50-year wave, and also the tidal range. Other factors that have to be considered are intensive UV radiation, salt-water spray, spume, aerosols, temperature change, mechanical loads, colonization by molluscs and other organisms and the attendant mechanical erosion due to animal organisms, and also chemical erosion due to discharges or secretions from animal organisms and from other marine organisms. These structural elements use steel tubes, which for reasons of corrosion prevention either can have air-tight seals or can have a concrete filling. There can moreover be electricity lines or other supply lines running through the structural steel tubes.

The steel tubes required for structural elements have hitherto been designed with wall thicknesses substantially (up to 25%) greater than immediately necessary, and conventional coating materials are used for corrosion prevention here, mostly based on epoxy resin or based on polyurethane. These coating material systems do not generally provide any particular protection from mechanical loads.

WO 2009/027429 discloses the use of a metallic pipe having a surface sheathed by a polyamide layer, for producing a pipeline laid without any trench or sand bed. WO 2010/094528 discloses the use of a metallic pipe sheathed by an extruded layer made of a polyamide moulding composition, for producing a pipeline laid in water. However, in both cases the pipeline is not exposed to the combination of mechanical loads, corrosive attack and UV attack which is typical in the present invention and which includes, for example, severe wave impact.

SUMMARY OF THE INVENTION

The invention is based on the object of providing structural steel tubes for the foundation structure of offshore structures, which are more effective than the relevant tubes known hitherto in providing protection from mechanical loads, and also from corrosion and UV irradiation.

The use of a steel tube sheathed by an extruded layer made of a polyamide moulding composition for incorporation into the foundation structure of an offshore structure achieves these objects and other objects discernible from the application documents.

DETAILED DESCRIPTION OF THE INVENTION

The offshore structure is preferably an offshore wind energy system, a drilling platform or a lighthouse.

The foundation structure of an offshore wind energy system is the structure which supports the tower. It extends from the foundation elements anchored in the sea floor and continues, by way of the underwater structure, as far as the point where the tower begins; this point may be above the still water level.

Examples of the types of foundation structure used are as follows:

The monopile structure is composed of one hollow cylindrical pile. Monopiles are used in many European offshore wind parks which are near to the shore; it is suitable for foundations in water depths up to about 20 metres. Monopiles can be easy and quick to install; however, construction requires heavy piling equipment.

A jacket is a steel framework structure similar to the structure used in conventional electricity pylons. Piles anchor the four feet of the jacket in the sea floor. The structure of the jacket has already proven successful in relatively deep water in the oil industry. The framework structure can save from 40 to 50% of steel in comparison with the monopile. The rise in project costs is therefore only relatively small when this structure is used in relatively deep water. Since the individual structural components are relatively small, they are easy to produce and can be easy to transport and install.

The structure of a tripod is composed of three legs formed from steel tubes, and the central tube is superposed on the centre of the tripod. Each of the legs of the tripod can rest on one pile or on a plurality of piles. For pile-driving, there are centring sleeves arranged at the corners of the resulting equilateral triangle. There are horizontal struts connecting the piles to one another, and the piles are attached to the central tube by way of diagonal stays. The central tube is not bonded directly into the sea floor. Since steel tubes with relatively small diametres are used here, the tripod can be used in water deeper than 20 metres.

The quadropod involves a modification of the tripod concept using four instead of three legs. This achieves increased foundation rigidity in very deep water.

The tripile is composed of three steel columns which are anchored under water. A tripod structure is superposed on these steel columns above water level. According to manufacturer's information, tripile foundations are suitable for water depths from 25 up to 50 metres.

These structural elements are described by way of example in the following publications:

Fundamente für Offshore-Windenergieanlagen [Foundations for offshore wind energy systems], Deutsche Energie-Agentur GmbH, issued December 2009;

Florian Biehl, Kollisionssicherheit von Offshore-Windenergieanlagen [Collision safety of offshore wind energy systems], Stahlbau, Volume 78 (6), pp. 402-409 (2009);

K. Lesny, W. Richwien (Editors), Gründung von Offshore-Windenergieanlagen—Werkzeuge für Planung and Bemessung [Foundations for offshore wind energy systems—tools for design and dimensioning], VGE Verlag Glückauf 2008, ISBN: 978-3-86797-035-8;

DE 103 10 708 A1.

The polyamide that can be used according to the invention can be produced from a combination of diamine and dicarboxylic acid, from an ω-aminocarboxylic acid or from the corresponding lactam. In principle it is possible to use any polyamide, for example PA46, PA6, PA66 or copolyamides based thereon having units which derive from terephthalic acid and/or isophthalic acid (the general term used being PPA). In one preferred embodiment, the monomer units comprise on average at least 8, at least 9 or at least 10, carbon atoms. In the case of mixtures of lactams it is the arithmetic average that is considered here. In the case of a combination of diamine and dicarboxylic acid the arithmetic average of the number of carbon atoms of diamine and dicarboxylic acid in this preferred embodiment must be at least 8, at least 9 or at least 10. Examples of suitable polyamines are: PA610 (which can be produced from hexamethylenediamine [6 carbon atoms] and sebacic acid [10 carbon atoms], the average number of carbon atoms in the monomer units here therefore being 8), PA88 (which can be produced from octamethylenediamine and 1,8-octanedioic acid), PA8 (which can be produced from caprylolactam), PA612, PA810, PA108, PA9, PA613, PA614, PA812, PA128, PA1010, PA10, PA814, PA148, PA1012, PA11, PA1014, PA1212 and PA12. It is also possible, of course, to use copolyamides based on these, and it is also optionally possible here to make concomitant use of monomers such as caprolactam.

The polyamide can also be a polyetheresteramide or a polyetheramide. Polyetheramides are in principle known by way of example from DE-A 30 06 961. They comprise a polyetherdiamine as comonomer. Suitable polyetherdiamines are obtainable through conversion of the corresponding polyetherdiols by reactive amination or coupling to acrylonitrile with subsequent hydrogenation (e.g. EP-A-0 434 244; EP-A-0 296 852). They generally have a number-average molecular weight of from 230 to 4000; their polyetheramide content is preferably from 5 to 50% by weight.

Polyetherdiamines derived from propylene glycol are available commercially from Huntsman as JEFFAMINE® D products. Polyetherdiamines derived from 1,4-butanediol or 1,3-butanediol also have good suitability, as do polyetherdiamines of mixed structure, for example with random or blockwise distribution of the units deriving from the diols.

Mixtures of various polyamides can also be used, with the proviso of adequate compatibility. The person skilled in the art is aware of compatible polyamide combinations; combinations that may be listed here by way of example are PA12/PA1012, PA12/PA1212, PA612/PA12, PA613/PA12, PA1014/PA12 and PA610/PA12, and also corresponding combinations with PA11. In the case of doubt, compatible combinations can be determined by routine experimentation.

One preferred embodiment uses a mixture of from 30 to 99% by weight, particularly preferably from 40 to 98% by weight and with particular preference from 50 to 96% by weight, of polyamide in the narrower sense, and also from 1 to 70% by weight, particularly preferably from 2 to 60% by weight and with particular preference from 4 to 50% by weight, of polyetheresteramide and/or polyetheramide. Preference is given to polyetheramides here.

The moulding composition can comprise, alongside polyamide, other components, e.g. impact modifiers, other thermoplastics, plasticizers and other conventional additives. The only requirement is that the polyamide forms the matrix of the moulding composition.

Examples of suitable impact modifiers are ethylene/α-olefin copolymers, preferably selected from a) ethylene/$C_3$-$C_{12}$-α-olefin copolymers having from 20 to 96, preferably from 25 to 85, % by weight of ethylene. An example of a $C_3$-$C_{12}$-α-olefin used is propene, 1-butene, 1-pentene, 1-hexene, 1-octene, 1-decene or 1-dodecene. Typical examples here are ethylene-propylene rubber, and also LLDPE and VLDPE.

b) ethylene/$C_3$-$C_{12}$-α-olefin/unconjugated diene terpolymers having from 20 to 96, preferably from 25 to 85, % by weight of ethylene and up to at most about 10% by weight of an unconjugated diene, such as bicyclo [2.2.1]heptadiene, 1.4-hexadiene, dicyclopentadiene or 5-ethylidenenorbornene. A suitable $C_3$-$C_{12}$-α-olefin is likewise by way of example propene, 1-butene, 1-pentene, 1-hexene, 1-octene, 1-decene or 1-dodecene.

The production of these copolymers or terpolymers, for example with the aid of a Ziegler-Natta catalyst, is known in the art.

Other suitable impact modifiers are styrene-ethylene/butylene block copolymers. Here, it is preferable to use styrene-ethylene/butylene-styrene block copolymers (SEBS), where these are obtainable via hydrogenation of styrene-butadiene-styrene block copolymers. However, it is also possible to use diblock systems (SEB) or multiblock systems.

These impact modifiers preferably comprise anhydride groups, where these are introduced in a known manner via thermal or free-radical reaction of the main-chain polymer with an unsaturated dicarboxylic anhydride, an unsaturated dicarboxylic acid or a monoalkyl ester of an unsaturated dicarboxylic acid, at a concentration sufficient for good coupling to the polyamide. Examples of suitable reagents are maleic acid, maleic anhydride, monobutyl maleate, fumaric acid, citraconic anhydride, aconitic acid or itaconic anhydride. It is preferable that from 0.1 to 4% by weight of an unsaturated anhydride have been grafted onto the impact modifier by this method. According to the prior art, the unsaturated dicarboxylic anhydride or precursor thereof can also be used as graft together with another unsaturated monomer, such as styrene, α-methylstyrene or indene.

Other suitable impact modifiers are copolymers which contain units of the following monomers:

a) from 20 to 94.5% by weight of one or more α-olefins having from 2 to 12 carbon atoms, b) from 5 to 79.5% by weight of one or more acrylic compounds, selected from
   acrylic acid, methacrylic acid, and salts thereof,
   esters of acrylic acid or, respectively, methacrylic acid with a $C_1$-$C_{12}$ alcohol, where these can optionally bear a free hydroxy or epoxy function, acrylonitrile or methacrylonitrile,
acrylamides or methacrylamides,
c) from 0.5 to 50% by weight of an olefinically unsaturated epoxide, carboxylic anhydride, carboximide, oxazoline or oxazinone.

These copolymers are described in more detail in WO 2010/094528; the disclosure in that document is expressly incorporated into this application.

In one preferred embodiment, the polyamide moulding composition comprises the following components:
1. from 60 to 96.5 parts by weight of polyamide,
2. from 3 to 39.5 parts by weight of an impact-modifying component which contains anhydride groups, where the impact-modifying component has been selected from ethylene/α-olefin copolymers and styrene-ethylene/butylene block copolymers,
3. from 0.5 to 20 parts by weight of a copolymer which contains units of the following monomers:
    a) from 20 to 94.5% by weight of one or more α-olefins having from 2 to 12 carbon atoms,
    b) from 5 to 79.5% by weight of one or more acrylic compounds, selected from
        acrylic acid, methacrylic acid and salts thereof,
        esters of acrylic acid or, respectively, methacrylic acid with a $C_1$-$C_{12}$ alcohol, where this can optionally bear a free hydroxy or epoxy function,
        acrylonitrile or methacrylonitrile,
        acrylamides or methacrylamides,
    c) from 0.5 to 50% by weight of an olefinically unsaturated epoxide, carboxylic anhydride, carboximide, oxazoline or oxazinone, where the total of the parts by weight of components according to 1., 2., and 3. is 100.

In another preferred embodiment, this moulding composition comprises:
1. from 65 to 90 parts by weight and particularly preferably from 70 to 85 parts by weight of polyamide,
2. from 5 to 30 parts by weight, particularly preferably from 6 to 25 parts by weight and with particular preference from 7 to 20 parts by weight of the impact-modifying component,
3. from 0.6 to 15 parts by weight and particularly preferably from 0.7 to 10 parts by weight of the copolymer, which preferably contains units of the following monomers:
    a) from 30 to 80% by weight of α-olefin(s),
    b) from 7 to 70% by weight and particularly preferably from 10 to 60% by weight of the acrylic compound(s),
    c) from 1 to 40% by weight and particularly preferably from 5 to 30% by weight of the olefinically unsaturated epoxide, carboxylic anhydride, carboximide, oxazoline, or oxazinone.

Another impact-modifying component that can also be used is nitrile rubber (NBR) or hydrogenated nitrile rubber (HNBR), where these optionally contain functional groups. U.S.2003/0220449A1 describes corresponding moulding compositions.

Other thermoplastics which can be present in the polyamide moulding composition are primarily polyolefins. In one embodiment, as described at an earlier stage above in relation to the impact modifiers, they can contain anhydride groups, and are then optionally present together with an unfunctionalized impact modifier. In another embodiment, these are unfunctionalized and are present in the moulding composition in combination with a functionalized impact modifier or with a functionalized polyolefin. The term "functionalized" means that the polymers have been provided according to the prior art with groups that can react with the end groups of the polyamide, examples being anhydride groups, carboxy groups, epoxy groups, or oxazoline groups. Preference is given here to the following constitutions:
1. from 50 to 95 parts by weight of polyamide,
2. from 1 to 49 parts by weight of functionalized or unfunctionalized polyolefin, and also
3. from 1 to 49 parts by weight of functionalized or unfunctionalized impact modifier, where the total of the parts by weight of components according to 1., 2., and 3. is 100.

The polyolefin is by way of example polyethylene or polypropylene. In principle, it is possible to use any commercially available grade. Examples of those that can be used are therefore: high-, medium-, or low-density linear polyethylene, LDPE, ethylene-acrylate copolymers, ethylene-vinyl acetate copolymers, isotactic or atactic homopolypropylene, random copolymers of propene with ethene and/or 1-butene, ethylene-propylene block copolymers, etc. The polyolefin can be produced by any known process, for example by the Ziegler-Natta or the Phillips process, or by means of metallocenes, or by a free-radical route. In this case the polyamide can also be, for example, PA6 and/or PA66.

In one possible embodiment, the moulding composition comprises from 1 to 25% by weight of plasticizer, particularly preferably from 2 to 20% by weight, and with particular preference from 3 to 15% by weight.

Plasticizers and their use with polyamides are known. A general overview of plasticizers suitable for polyamides can be found in Gächter/Müller, Kunststoffadditive [Plastics Additives], C. Hanser Verlag, 2nd Edition, p. 296. Examples of conventional compounds suitable as plasticizers are esters of p-hydroxybenzoic acid having from 2 to 20 carbon atoms in the alcohol component, or amides of arylsulphonic acids having from 2 to 12 carbon atoms in the amine component, preferably amides of benzenesulphonic acid. Plasticizers that can be used are inter alia ethyl p-hydroxybenzoate, octyl p-hydroxybenzoate, isohexadecyl p-hydroxybenzoate, N-n-octyltoluenesulphonamide, N-n-butylbenzenesulphonamide, or N-2-ethylhexylbenzenesulphonamide.

The moulding composition can moreover also comprise conventional amounts of additives which are needed in order to establish certain properties. Examples of these are pigments or fillers, such as carbon black, titanium dioxide, zinc sulphide, silicates or carbonates reinforcing fibres, e.g. glass fibres, processing aids, such as waxes, zinc stearate or calcium stearate, flame retardants such as magnesium hydroxide, aluminium hydroxide or melamine cyanurate, antioxidants, UV stabilizers, hydrolysis stabilizers and also additions which give the product antielectrostatic properties or electrical conductivity, for example carbon fibres, graphite fibrils, stainless-steel fibres, or conductive carbon black. The polyamide moulding composition preferably comprises from 0.01 to 3% by weight of carbon black to improve UV resistance, and also biocides to inhibit colonization by molluscs and other maritime organisms.

Good mechanical robustness of the polyamide sheath is in particular obtained when the viscosity of the polyamide moulding composition applied is at least 2000 Pa·s, preferably at least 2300 Pa·s, particularly preferably at least 3000 Pa·s, with particular preference at least 5000 Pa·s and very particularly preferably at least 8000 Pa·s, at 240° C. and at a shear rate of 0.1 1/s. Viscosity is determined in a cone-and-plate viscosimetre in accordance with ASTM D4440-3.

High viscosity of the polyamide moulding composition is generally attended by high molecular weight of the polyamide. Solution viscosity is a measure of the molecular weight of the polyamide. For the purposes of the invention it is preferable that the relative solution viscosity $\eta_{rel}$ the polyamide in the moulding composition applied is at least 1.5, particularly preferably at least 1.8, with particular preference at least 2.0 and very particularly preferably at least 2.2, measured on a 0.5% by weight solution in m-cresol at 23° C. in accordance with ISO 307.

A known process for producing polyamides of this type is solid-phase post-condensation of pelletized low-viscosity polyamides to give high-viscosity polyamide at a temperature lower than the melting point. The process is described by way of example in CH 359 286, and also U.S. Pat. No. 3,821,171. The solid-phase post-condensation of polyamides is normally carried out in a batchwise- or continuously operating dryer under inert gas or in vacuo. This method permits production of polyamides with very high molecular weight.

Another method of producing high-viscosity polyamides is continuous post-condensation in the melt with use of various types of screw-based apparatuses.

WO 2006/079890 states that high-viscosity polyamide moulding compositions can be obtained by mixing a high-molecular-weight polyamide and a low-molecular-weight polyamide.

Another possible route to high-viscosity polyamides or high-viscosity polyamide moulding compositions uses molecular-weight-increasing additives; suitable additives and/or processes are described by way of example in the following specifications: WO 98/47940, WO 96/34909, WO 01/66633, WO 03/066704, JP-A-01/197526, JP-A-01/236238, DE-B-24 58 733, EP-A-1 329 481, EP-A-1 518 901, EP-A-1 512 710, EP-A-1 690 889, EP-A-1 690 890, and WO 00/66650.

However, the moulding compositions produced in accordance with this prior art generally require very high current consumption or very high torque in the extrusion process, with high pressure at the die. Furthermore, the high shear forces result in appreciable chain cleavage, thus reducing molecular weight during processing.

For the purposes of the invention, it is therefore preferable that the condensation process to increase the molecular weight of the polyamide moulding composition, with the aid of a molecular-weight-increasing additive, is delayed until the processing procedure has begun. The invention therefore also provides the use in accordance with the claims of a pipe where the extruded layer made of a polyamide moulding composition has been applied by means of the following process steps:

a) provision of a polyamide moulding composition,
b) production of a premix of the polyamide moulding composition and of the molecular-weight-increasing additive, for example a compound having at least two carbonate units,
c) if appropriate, storage and/or transport of the mixture, and
d) then use of the mixture for the extrusion process, where the condensation process to increase molecular weight is delayed until this step has begun.

It has been found that with this mode of addition during processing a significant increase in melt stiffness occurs, while the load on the motor is simultaneously low. It is therefore possible, despite high melt viscosity, to achieve high processing throughputs, the result of this being an improvement in the cost-effectiveness of the production process. The process is described by way of example below for the case where the molecular-weight-increasing additive is a compound having at least two carbonate units.

The molecular weight $M_n$ of the starting polyamide is preferably greater than 5000, in particular greater than 8000. Polyamides used here are those whose end groups at least to some extent take the form of amino groups. By way of example, at least 30%, at least 40%, at least 50%, at least 60%, at least 70%, at least 80% or at least 90%, of the end groups take the form of amino end groups. The production of polyamides having relatively high amino end group content, using diamines or polyamines as a chain-transfer agent, is prior art. In the present instance, the production of the polyamide preferably uses an aliphatic, cycloaliphatic or araliphatic diamine having from 4 to 44 carbon atoms, as chain-transfer agent. Examples of suitable diamines are hexamethylenediamine, decamethylenediamine, 2,2,4- or 2,4,4-trimethylhexamethylenediamine, dodecamethylenediamine, 1,4-diaminocyclo-hexane, 1,4- or 1,3-dimethylaminocyclohexane, 4,4'-diaminodicyclohexylmethane, 4,4'-diamino-3,3'-dimethyldicyclohexylmethane, 4,4'-diaminodicyclohexylpropane, isophoronediamine, metaxylylenediamine or paraxylylenediamine.

In another preferred embodiment, a polyamine is used as chain-transfer agent and simultaneously as branching agent during the production of the polyamide. Examples here are diethylenetriamine, 1,5-diamino-3-(β-aminoethyl)pentane, tris(2-amino-ethyl)amine, N,N-bis(2-aminoethyl)-N',N'-bis[2-[bis(2-aminoethyl)amino]ethyl]-1,2-ethanediamine, dendrimers, and polyethyleneimines, in particular branched polyethyleneimines, which are obtainable via polymerization of aziridines (Houben-Weyl, Methoden der Organischen Chemie [Methods of organic chemistry], Volume E20, pages 1482-1487, Georg Thieme Verlag Stuttgart, 1987), and which generally have the following amino group distribution:
from 25 to 46% of primary amino groups,
from 30 to 45% of secondary amino groups and
from 16 to 40% of tertiary amino groups.

The compound having at least two carbonate units is used in a quantitative proportion of from 0.005 to 10% by weight, calculated as a ratio to the polyamide used. The said ratio is preferably in the range from 0.01 to 5.0% by weight, particularly preferably in the range from 0.05 to 3% by weight. The expression "carbonate" here means esters of carbonic acid in particular with phenols or with alcohols.

The compound having at least two carbonate units can be of low molecular weight, or oligomeric or polymeric. It can be composed entirely of carbonate units, or it can also io have other units. These are preferably oligo- or polyamide units, oligo- or polyester units, oligo- or polyether units, oligo- or polyetheresteramide units or oligo- or polyetheramide units. These compounds can be produced via known oligo- or polymerization processes or by polymer-analogous reactions.

In one preferred embodiment, the compound having at least two carbonate units is a polycarbonate, for example one based on bisphenol A, or is a block copolymer which contains a polycarbonate block of this type.

When the compound used as additive and having at least two carbonate units is metreed in in the form of a masterbatch, this permits more precise metreing of the additive, since the amounts used are larger. It has moreover been found that the use of a masterbatch achieves improved extrudate quality. The masterbatch preferably encompasses, as matrix material, the polyamide whose molecular weight has also been increased by the condensation process according to the invention, or a polyamide compatible therewith, but under the reaction conditions it is also possible for partial linkage to occur between incompatible polyamides and the polyamide whose molecular weight is to be increased by a condensation process, and this results in compatibilization. The molecular weight $M_n$ of the polyamide used as matrix material in the masterbatch is preferably greater than 5000 and in particular greater than 8000. Preference is given here to those polyamides whose end groups mainly take the form of carboxylic acid groups. By way of example, at least 80%, at least 90% or at least 95% of the end groups take the form of acid groups. As an alternative to this, it is possible to use polyetheramides having end groups which are predominantly amino groups; this method achieves improved hydrolysis resistance.

The concentration of the compound having at least two carbonate units in the masterbatch is preferably from 0.15 to 50% by weight, particularly preferably from 0.2 to 25% by weight and with particular preference from 0.3 to 15% by weight. This type of masterbatch is produced in the usual manner known to the person skilled in the art.

Suitable compounds having at least two carbonate units, and suitable masterbatches, are described in detail in WO 00/66650, expressly incorporated herein by way of reference.

The invention can be used with polyamides which, as a result of the production process, comprise at least 5 ppm of phosphorus in the form of an acidic compound. In this instance, from 0.001 to 10% by weight, based on the polyamide, of a salt of a weak acid is added to the polyamide moulding composition prior to the compounding process or during the compounding process. DE-A 103 37 707 discloses suitable salts, and is hereby expressly incorporated herein by way of reference.

However, the invention has equally good applicability to polyamides which, as a result of the production process, comprise less than 5 ppm of phosphorus or no zo phosphorus in the form of an acidic compound. Although a corresponding salt of a weak acid can be added in this instance, it is not necessary to do so.

The compound having at least two carbonate units is added as it stands or in the form of a masterbatch, not until after the compounding process, i.e. not until after the production of the polyamide moulding composition, but at the latest during processing. It is preferable that, during processing, the polyamide whose molecular weight is to be increased by a condensation process, or the polyamide moulding composition whose molecular weight is to be increased by a condensation process, is mixed in the form of pellets with the pellets or powder of the compound having at least two carbonate units, or with the corresponding masterbatch. However, it is also possible that a mixture of pellets of the finished compounded polyamide moulding composition with the compound having at least two carbonate units or with the masterbatch is produced, and then transported or stored and then processed. It is naturally also possible to use powder mixtures in corresponding operations. The decisive factor is that the mixture is not melted until processing has begun. Thorough mixing of the melt during processing is to be recommended. However, it is also equally possible that the masterbatch in the form of melt stream is added by metreing with the aid of an ancillary extruder to the melt of the polyamide moulding composition to be processed, and then incorporated by thorough mixing; in that case, process steps b) and d) are combined.

In place of the compound having at least two carbonate units it is also possible to use any other suitable molecular-weight-increasing additive, for example an additive disclosed in the abovementioned literature. Here again, suitable quantitative proportions are from 0.005 to 10% by weight, calculated as a ratio to the polyamide used, preferably from 0.01 to 5.0% by weight, particularly preferably from 0.05 to 3% by weight.

The thickness of the polyamide layer applied has to be at least sufficient to permit production of a coherent layer under the conditions of the application process. It is preferable that the layer thickness is at least 0.5 mm, particularly at least 1.0 mm, and in particular at least 1.2 mm.

Layer thicknesses that have usually proven successful are up to about 8 mm, preferably up to about 7 mm, particularly preferably up to about 6 mm and with particular preference up to about 5 mm. However, it is also possible if necessary to select a thicker layer, for example up to 30 mm or above.

The polyamide layer can have been applied directly on the metal surface. In this case it is advantageous for the polyamine moulding composition to comprise an adhesive resin, for example epoxy resin (for example Araldite®). However, there is generally at least one further layer between the metal surface and the polyamide layer. Layers involved here can by way of example be as follows:
- a ceramic layer, for example according to WO 03/093374;
- a primer layer, for example made of epoxy resin (U.S. Pat. No. 5,580,659) or of a water-based mixture of epoxy resin and polyacrylate latex (WO 00/04106);
- an adhesion-promoter layer made of a hot-melt polyamide adhesive which can by way of example be applied as powder by spraying, etc. (EP 1 808 468 A2), or made of a polyolefin which bears functional groups. Functional groups that can be used are by way of example carboxy groups or anhydride groups (WO 02/094922), epoxy groups or alkoxysilane groups (EP-A-0 346 101). The polyolefin layer can also have been foamed. The polyolefin is preferably polyethylene or polypropylene;
- a differently constituted adhesion promoter, intended to ensure that mechanical stress does not impair the bond between polyamide layer and underlying material;
- textile reinforcement in the form of woven or mats, for example made of glass fibres or aramid fibres (Kevlar).

The following layer arrangements are preferred:
metal/ceramic layer/polyamide layer;
metal/ceramic layer/primer layer/polyamide layer;
metal/ceramic layer/primer layer/adhesion promoter/polyamide layer;
metal/primer layer/polyamide layer;
metal/primer layer/adhesion promoter/polyamide layer;
metal/primer layer/polyolefin layer/polyamide layer;
metal/primer layer/adhesion promoter/polyolefin layer/polyamide layer;
metal/primer layer/adhesion promoter/polyolefin layer/adhesion promoter/polyamide layer;
metal/adhesion promoter/polyamide layer.

Any desired process can be used to apply a possible ceramic layer, primer layer and/or polyolefin layer to the tube. Suitable processes are prior art.

The polyamide layer is applied in accordance with known processes, for example by means of an extruded-tube process or extruded-wrapping process. In one possible variant, the polyamide layer together with a polyolefin layer or adhesion promoter layer likewise to be applied is produced and applied through coextrusion of a multilayer composite.

The extruded-tube process and the extruded-wrapping process are tube-sheathing processes that have been in successful use for a long time. These processes are described in more detail in Stahlrohr-Handbuch [Steel tube handbook], 12th Edition, pp. 392-409, Vulkan-Verlag Essen, 1995.

The external diametre of the metal tube is preferably at least 20 mm and at most 7000 mm.

The individual tubes are structurally bonded to one another in a known manner, for example through welding.

Because the polyamide layer applied has high mechanical strength, good abrasion properties, very high scratch resistance, good adhesion, and also optimized thickness and excellent resistance to the effects of sea water and the atmosphere, the invention can ensure good corrosion prevention together with good protection from mechanical effects.

The invention also provides the foundation structure obtained during the use in accordance with the claims for an offshore structure, for example for an offshore wind energy system. A feature of this foundation structure according to the invention, in comparison with structures of the prior art, is moreover significantly prolonged lifetime, since the process of extrusion coating significantly reduces the extent of coating defects.

The invention claimed is:

1. An offshore structure comprising a foundation structure wherein a steel tube sheathed by an extruded layer is incorporated into the foundation structure, wherein said extruded layer comprises a polyamide moulding composition.

2. The offshore structure of claim 1, wherein the extruded layer comprises the polyamide moulding composition having a thickness of from 0.5 to 30 mm.

3. The offshore structure of claim 2, wherein the offshore structure is an offshore wind energy system.

4. The offshore structure of claim 3, wherein the foundation structure is a monopile, a jacket, a tripod, a quadropod or a tripile.

5. The offshore structure of claim 2, wherein the extruded layer is prepared by a process comprising:
   a) mixing the polyamide moulding composition and a molecular-weight-increasing additive to form a mixture,
   b) extruding the mixture, and
   c) condensing the mixture, wherein the condensation process to increase molecular weight is delayed until extrusion has begun.

6. The offshore structure of claim 1, wherein between the steel tube and the extruded layer comprising the polyamide moulding composition there is at least one further layer selected from the group consisting of
   a ceramic layer
   a primer layer
   an adhesion-promoter layer and
   a textile reinforcement layer.

7. The offshore structure of claim 6, wherein between the steel tube and the layer comprising the polyamide moulding composition there is a textile reinforcement layer that is woven or matted.

8. The offshore structure of claim 1, wherein the extruded polyamide moulding composition has a viscosity at 240° C. and at a shear rate of 0.1 1/s in accordance with ASTM D4440-3 is at least 2000 Pa·s.

9. The offshore structure of claim 1, wherein the relative solution viscosity $\eta_{rel}$ of the polyamide in the extruded moulding composition has a relative solution viscosity $\eta_{rel}$ in accordance with ISO 307 of at least 1.5.

10. The offshore structure of claim 1, wherein the polyamide moulding composition further comprises at least one other component selected from the group consisting of an impact modifier, a thermoplastic, and a plasticizer.

11. The offshore structure of claim 1, wherein the polyamide moulding composition comprises
   a) from 60 to 96.5 parts by weight of polyamide,
   b) from 3 to 39.5 parts by weight of an impact-modifying component which comprises anhydride groups, where the impact-modifying component has been selected from the group consisting of ethylene/α-olefin copolymers and styrene-ethylene/butylene block copolymers,
   c) from 0.5 to 20 parts by weight of a copolymer which comprises:
      i) from 20 to 94.5% by weight of one or more α-olefins having from 2 to 12 carbon atoms,
      ii) from 5 to 79.5% by weight of one or more acrylic compounds selected from
         acrylic acid, methacrylic acid and salts thereof,
         esters of acrylic acid or, respectively, methacrylic acid with a $C_1$-$C_{12}$ alcohol, which optionally bear a free hydroxy or epoxy function,
         acrylonitrile or methacrylonitrile,
         acrylamides or methacrylamides,
      iii) from 0.5 to 50% by weight of an olefinically unsaturated epoxide, carboxylic anhydride, carboximide, oxazoline or oxazinone,
      where the total of the parts by weight of components a) b) and c) is 100.

12. The offshore structure of claim 1, wherein the polyamide moulding composition comprises:
   a) from 65 to 90 parts by weight of polyamide,
   b) from 5 to 30 parts by weight of an impact-modifying component,
   c) from 0.6 to 15 parts by weight of a copolymer comprising units of the following monomers:
      i) from 30 to 80% by weight of an α-olefin,
      ii) from 7 to 70% by weight of an acrylic compound, and
      iii) from 1 to 40% by weight of the olefinically unsaturated epoxide, carboxylic anhydride, carboximide, oxazoline, or oxazinone.

13. The offshore structure of claim 1, wherein the extruded layer is formed by a process comprising:
   a) mixing the polyamide moulding composition and a molecular-weight-increasing additive to form a mixture,
   b) extruding the mixture, and
   c) condensing the mixture, wherein the condensation process to increase molecular weight is delayed until extrusion has begun.

14. The offshore structure of claim 13, wherein the molecular-weight-increasing additive is a compound having at least two carbonate units.

15. The offshore structure of claim 1, wherein the polyamide moulding composition comprises from 1 to 25% by weight of plasticizer.

16. The offshore structure of claim 1, wherein said offshore structure is an offshore wind energy system.

17. The offshore structure of claim 1, wherein the polyamide moulding composition comprises:
   a) from 60 to 96.5 parts by weight of polyamide,
   b) from 3 to 39.5 parts by weight of an impact-modifying component which comprises anhydride groups, where the impact-modifying component has been selected from the group consisting of ethylene/α-olefin copolymers and styrene-ethylene/butylene block copolymers,
   c) from 0.5 to 20 parts by weight of a copolymer which comprises:

i) from 20 to 94.5% by weight of one or more α-olefins having from 2 to 12 carbon atoms,
ii) from 5 to 79.5% by weight of one or more acrylic compounds selected from
   acrylic acid, methacrylic acid and salts thereof,
   esters of acrylic acid or, respectively, methacrylic acid with a $C_1$-$C_{12}$ alcohol, which optionally bear a free hydroxy or epoxy function,
   acrylonitrile or methacrylonitrile,
   acrylamides or methacrylamides,
iii) from 0.5 to 50% by weight of an olefinically unsaturated epoxide, carboxylic anhydride, carboximide, oxazoline or oxazinone,
where the total of the parts by weight of components a) b) and c) is 100.

18. The offshore structure of claim 1, wherein the polyamide moulding composition comprises:
a) from 65 to 90 parts by weight of polyamide,
b) from 5 to 30 parts by weight of an impact-modifying component,
c) from 0.6 to 15 parts by weight of a copolymer comprising units of the following monomers:
   i) from 30 to 80% by weight of an α-olefin,
   ii) from 7 to 70% by weight of an acrylic compound, and
   iii) from 1 to 40% by weight of the olefinically unsaturated epoxide, carboxylic anhydride, carboximide, oxazoline, or oxazinone.

19. The offshore structure of claim 1, which is a drilling platform.

20. The offshore structure of claim 1, which is a lighthouse.

* * * * *